Sept. 27, 1938. C. H. ARNOLD 2,131,262
CASH REGISTER
Original Filed June 16, 1934 4 Sheets—Sheet 1
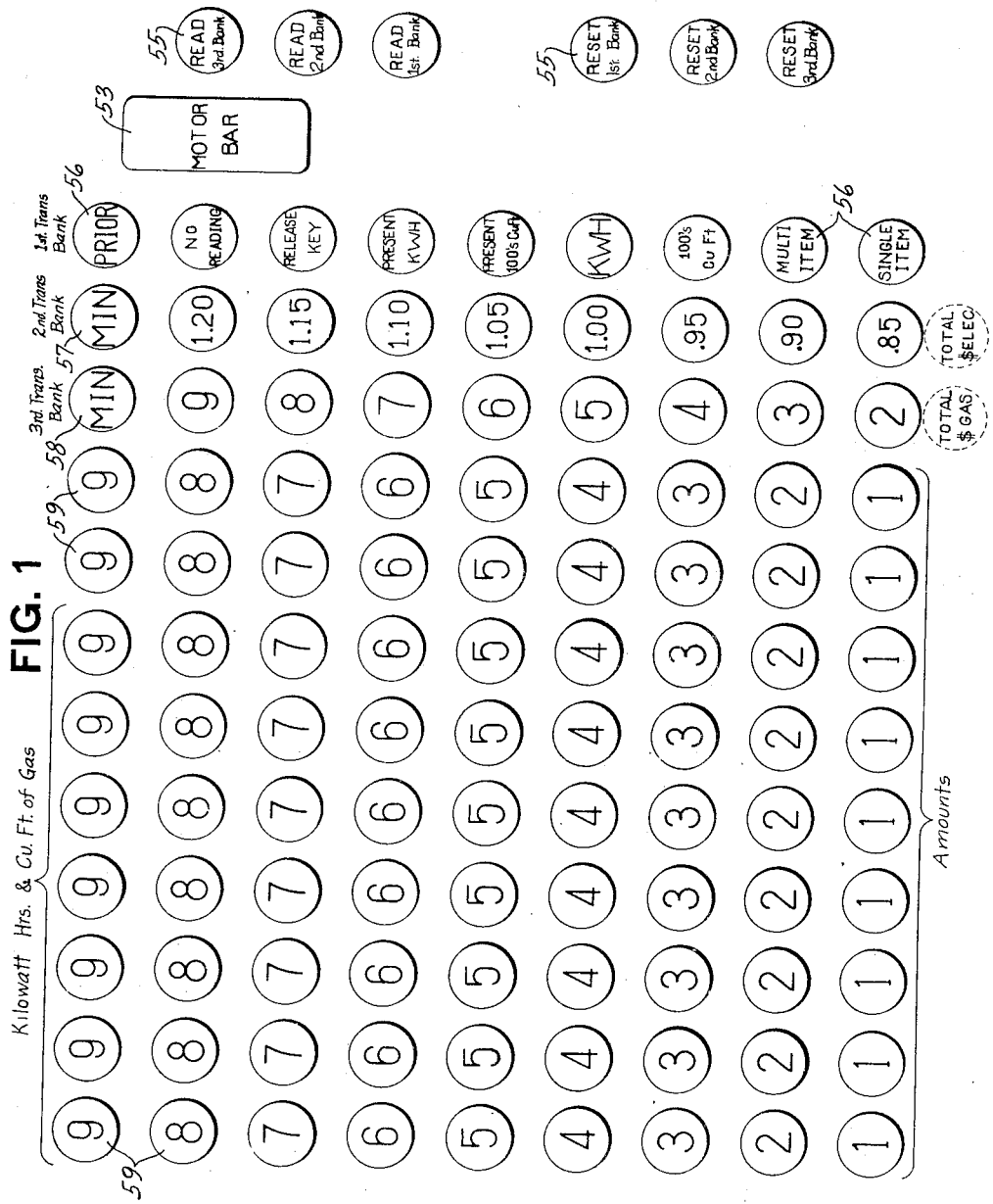
Inventor
Charles H. Arnold
By
Pearl Benst
His Attorney

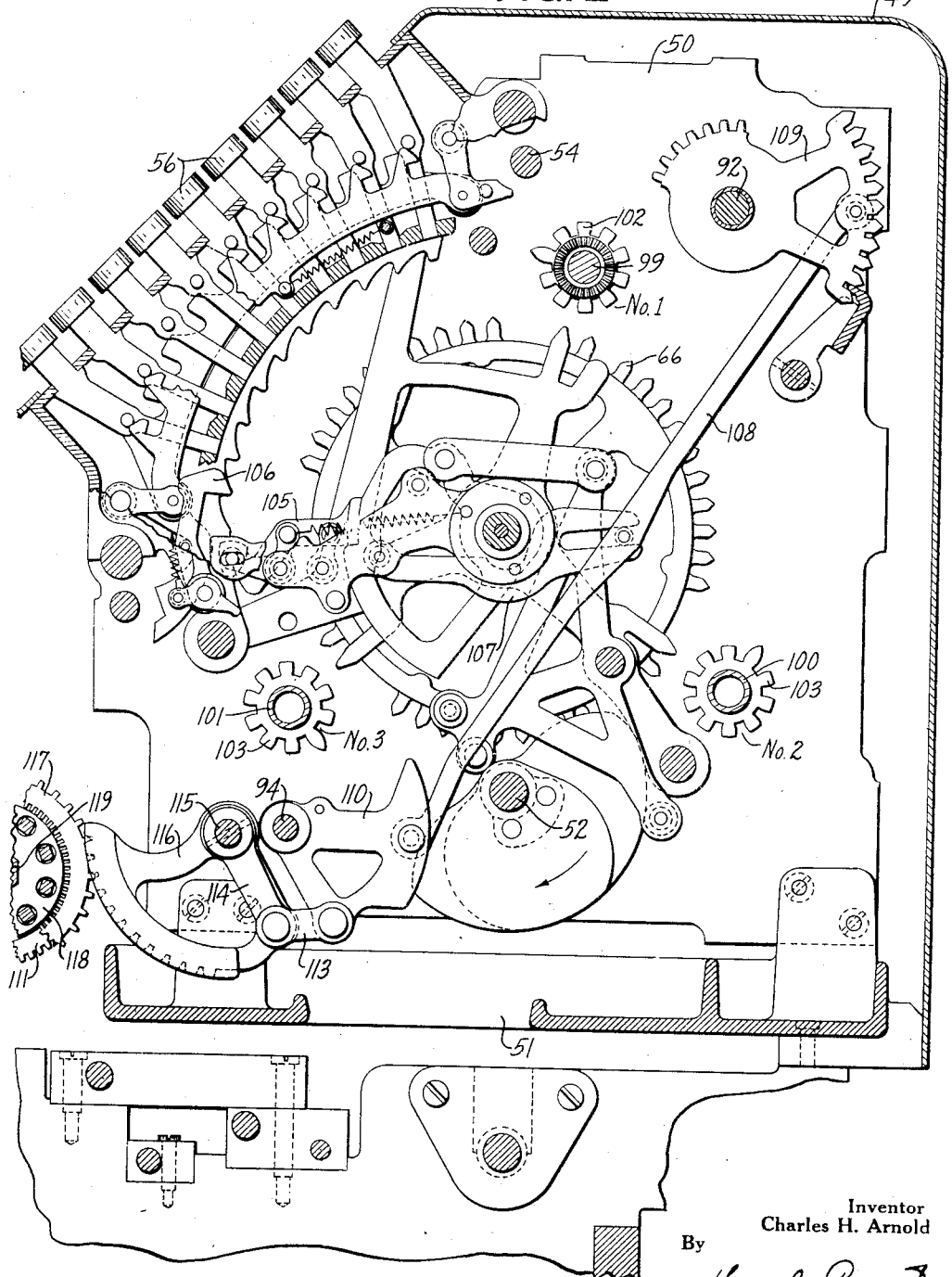

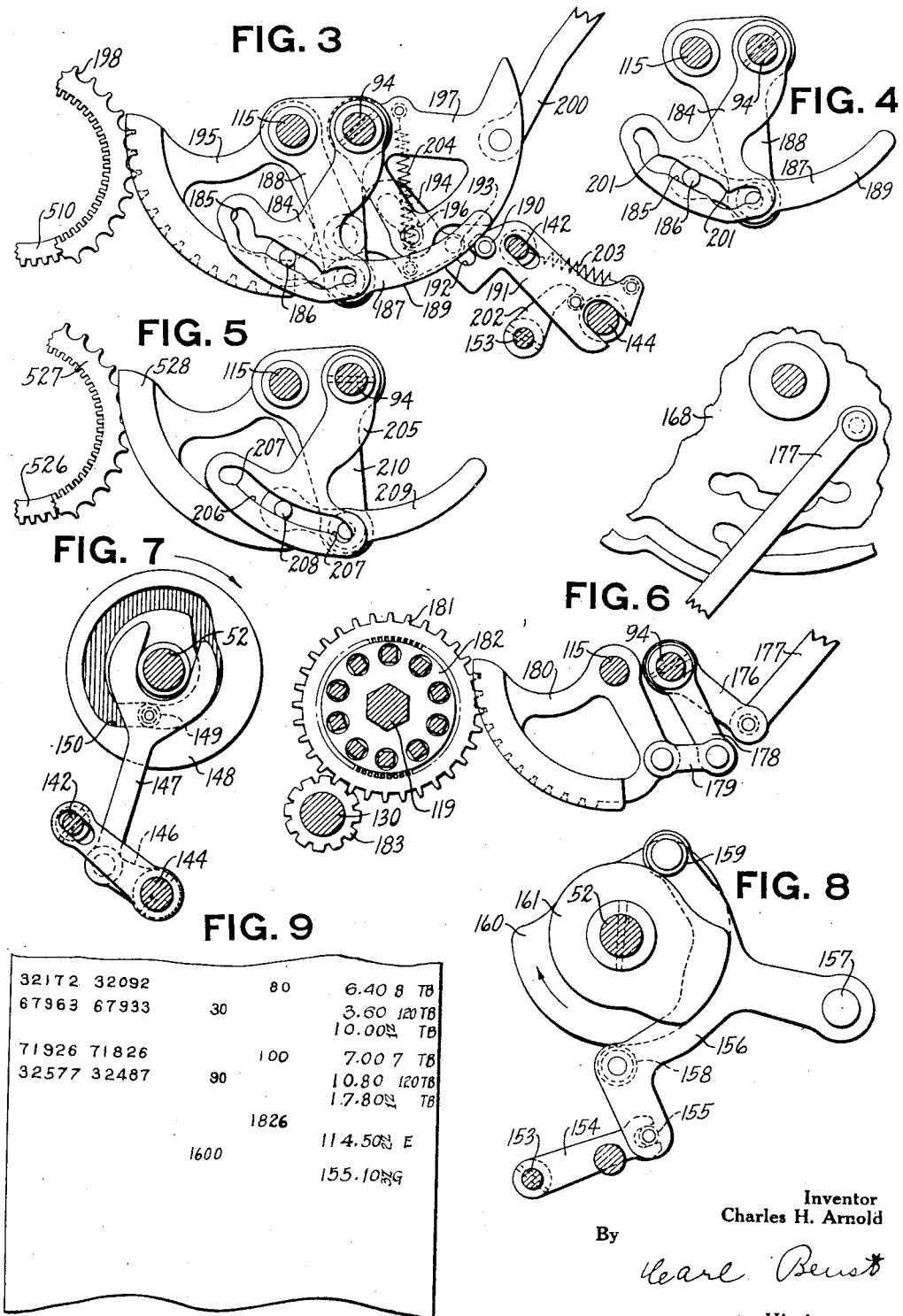

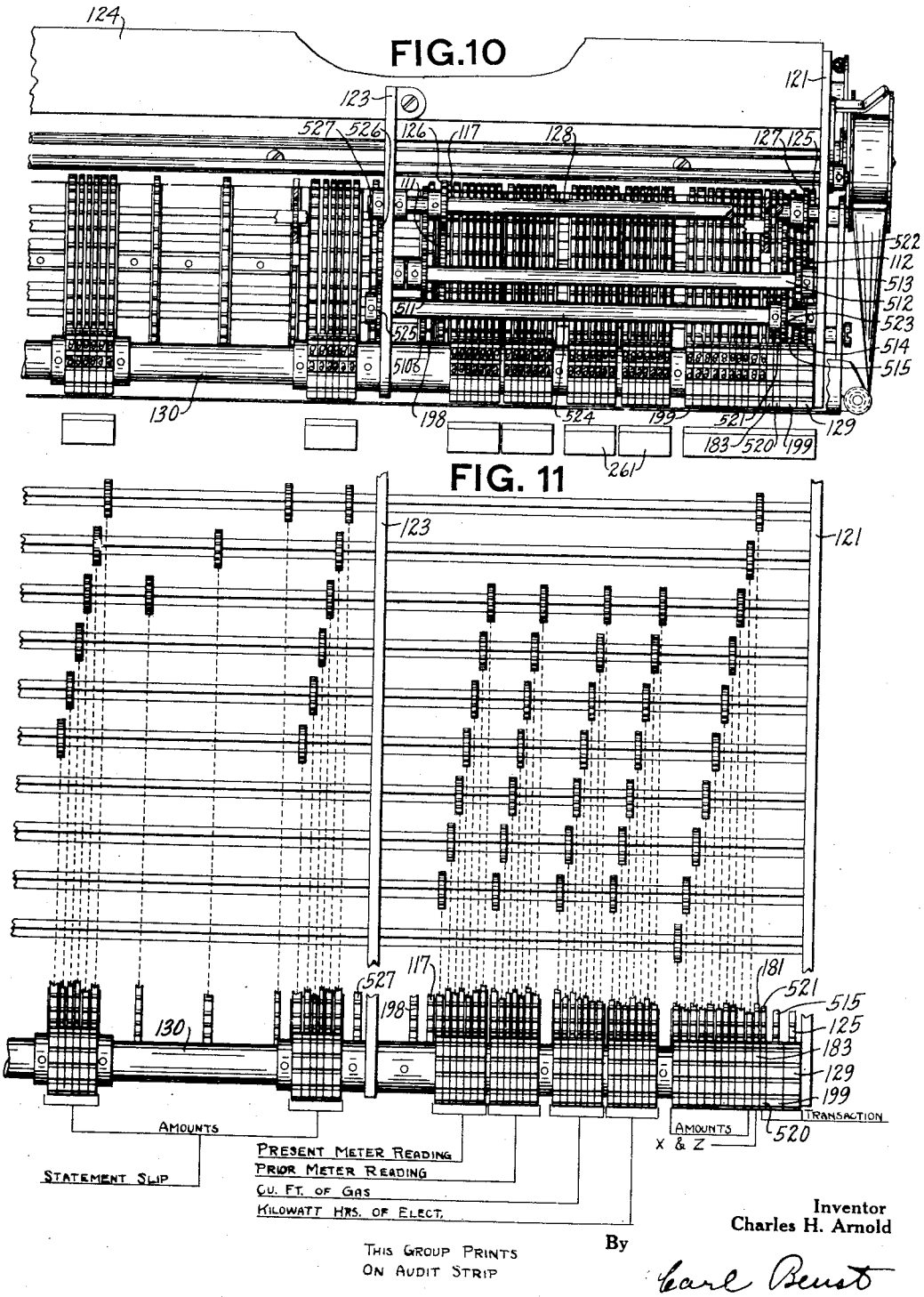

Patented Sept. 27, 1938

2,131,262

UNITED STATES PATENT OFFICE 2,131,262

CASH REGISTER

Charles H. Arnold, Dayton, Ohio, assignor to The National Cash Register Company, Dayton, Ohio, a corporation of Maryland Original application June 16, 1934, Serial No. 730,880. Divided and this application July 13, 1936, Serial No. 90,329

6 Claims. (Cl. 235—2)

This invention relates to improvements in cash registers of the type illustrated and described in Letters Patent of the United States Nos. 1,619,796, 1,747,397, and 1,761,542, issued respectively March 1, 1927, February 18, 1930, and June 3, 1930, to B. M. Shipley, and the copending application of M. M. Goldberg filed August 27, 1931, Serial No. 559,720, and is a division of applicant's pending application Serial No. 730,880 filed June 16, 1934.

It is generally the custom for public utility companies that supply communities with electrical current and gas, to furnish their numerous subscribers with a periodical statement of their accounts. These statements are, as a rule, composed of various detachable bills, coupons, and stubs; for example, a bookkeeping coupon, a subscriber's bill and coupon, and a collector's coupon. Upon each of these coupons, stubs, and bills, various data and amounts are duplicated, and to this end a cash register of the type which simultaneously prints in a plurality of columns, otherwise known as a column printing register, is admirably adapted.

A more specific object is to construct a cash register which duplicates the printing of various data and amounts in the several columns on record material during one machine operation.

Another object is to provide novel means to position certain of the type wheels independently of the differential mechanism in order to print certain designating characters or symbols on the audit strip to assist the auditor in determining what the amounts opposite those symbols represent.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Fig. 1 is a diagrammatic view of the keyboard of the machine of the present invention.

Fig. 2 is a sectional view showing a transaction bank and its associated differential mechanism.

Fig. 3 is a side elevation illustrating the mechanism for positioning the second and third transaction type wheels independently of the differential mechanism.

Fig. 4 is a detail view of the controlling cam for the second transaction bank.

Fig. 5 is a detail view of the controlling cam for the third transaction bank.

Fig. 6 is a detail view of a part of the mechanism for transmitting differential movement of the total control plate to the read and reset type wheel.

Fig. 7 is a detail view of the operating means for the type wheel setting device.

Fig. 8 is a detail view of the mechanism which controls the type wheel setting control slides.

Fig. 9 is a facsimile of a fragment of an audit strip used in the machine embodying the present invention.

Fig. 10 is a partial front view of the printing mechanism.

Fig. 11 is a partial diagrammatic view of the type wheel driving lines.

General description

In its present embodiment, the machine embracing the present invention is arranged for use by public utility companies that supply electrical current and gas to a plurality of consumers. However, it is not intended to limit this machine to any one system or use, as with slight alteration it may be adapted for use in many other ways, all coming within the scope of this invention.

Described in general terms, the present invention is embodied in the well known type of cash register illustrated and described in the patents and applications referred to at the beginning of this specification. This machine is equipped with a column type printer located at the front of the machine, said printer being arranged to print in duplicate various amounts and data in the various columns of an insertable slip during one machine operation. In addition, a record of each transaction is printed in columnar alinement on an audit strip located at the right of the machine.

Detailed description

The present invention is embodied in the type of register illustrated and described in the patents referred to at the beginning of this specification. As machines of this character are well known in the art, the mechanism thereof having no direct bearing on the present invention will be but briefly described.

Machine framework and operating mechanism

Calling attention to Fig. 2, the mechanism of the machine proper is supported by two main frames 50, only one (the left frame) being here shown, and various other intermediate frames, cross frames, and braces. The main frames are in turn secured to a machine base 51 and the entire machine is enclosed in a suitable cabinet 49 also secured to the machine base 51.

The machine is operated by means of the usual electric motor (not shown) which is operatively connected to the main drive shaft 52 by the usual clutch mechanism and gearing.

Depressing the usual motor bar 53 (Fig. 1) releases a key lock shaft 54 (Fig. 2) for a slight clockwise movement under influence of a spring. This movement of the shaft 54 engages the clutch mechanism and closes the electrical circuit to the motor, thereby causing the machine to operate. Near the end of the machine operation the shaft 54 is rocked counterclockwise to release the depressed keys, disengage the clutch mechanism, and simultaneously open the motor switch in the usual manner.

If desired, or when electrical current is not available, the machine may be operated by means of a hand crank which is operatively connected to the main drive shaft 52 by means of a train of gears. Depressing the starting bar 53 (Fig. 1) releases the shaft 52 for rotation, as explained hereinbefore. The machine may then be operated by turning the hand crank.

As the motor, clutch, and releasing mechanism are of conventional design and old in the art, they have not been illustrated herein and will not be further described. However, reference may be had to the Shipley Patent No. 1,761,542 issued June 3, 1930, for a full disclosure of this operating mechanism.

Keyboard

Fig. 1 is a diagrammatic view of a typical keyboard arrangement for use by public utility companies.

Located at the extreme right of the keyboard is a series of total control keys 55 which control the reading and resetting of the different totalizers. Next in order is the motor bar 53 which, as previously stated, controls the operation of the machine. Next are three rows of transaction keys 56, 57, and 58, which select the different totalizers for engagement with their actuators in a manner later to be described. As presently constructed, the machine of this invention has nine rows of amount keys 59, which position the differential actuators in the well known manner.

Totalizers

By observing Fig. 2 it will be seen that the present machine has three lines of totalizers, an upper totalizer 99, a rear totalizer 100, and a front totalizer 101. The upper totalizer 99 is an add-subtract totalizer and has an add wheel and a subtract wheel 102 for each denominational unit, said wheels being reversely geared together so that one is always complementary to the other. In addition to the adding and subtracting wheels 102, the upper totalizer line has a plurality of sets of adding wheels which function in exactly the same manner as the front and rear totalizer wheels. The wheels of the upper totalizer line are shiftable laterally in relation to the actuators 66 under control of the first row of transaction keys 56 in the usual manner.

The rear and front totalizer lines each carry a plurality of sets of totalizer wheels 103 adapted to be selected, in the usual and well known manner, for alinement with the actuators 66 by the second and third rows of transaction keys 57 and 58 respectively. There is also a set of grand totalizer wheels on the front totalizer line arranged to be selected by depression of any of the keys 57 in the second transaction bank and a similar set of totalizer wheels on the rear totalizer line selected in a like manner by the keys 58 in the third transaction bank.

It will be noted by referring to Fig. 2 that the actuator 66 has three sets of gear teeth which cooperate respectively with the wheels on the three totalizer lines in the regular way.

Transaction keys

Directing attention to Fig. 2, which is a sectional view of the first transaction bank and which is representative of all the transaction banks, it will be noted that there is provided a latch mechanism 105, the latch of which is broken or released in zero position by a zero stop lever 106 and in other positions by the engagement with depressed transaction keys 56. The transaction latch 105 carries a beam 107, which, by means of a link 108, differentially positions the transaction indicator segment 109 secured on a shaft 92, and a printer segment 110 loose on the shaft 94.

At this point it is thought sufficient to state that in adding operations, the transaction banks of keys 56, 57, and 58, shown diagrammatically in Fig. 1, select totalizers to be engaged with the usual totalizer actuators to have amounts accumulated therein.

In total taking operations, the different sets of totalizer wheels on the different lines are selected and alined with the totalizer actuators, by means of the transaction keys 56, 57, and 58, in exactly the same manner as described for adding operations. In total taking operations, the different totalizer lines are selected for engagement with the actuators 66 by means of the total control keys 55 (Fig. 1). For example, depressing the first bank read key 55 in conjunction with one of the first transaction keys 56 will select the corresponding totalizer on the upper totalizer line for a reading operation. Likewise, using the first bank reset total control key in conjunction with one of the keys 56 selects the corresponding totalizer of the upper totalizer line for a resetting operation.

This key operated total control mechanism is fully illustrated and described in copending application of M. M. Goldberg, Serial Number 559,720, referred to at the beginning of this specification.

Printing mechanism

The method of driving the columns of type wheels is by means of ring gears having external and internal teeth. The ring gears are differentially positioned by means of their external teeth and pinions driven by internal teeth thereof operate square shafts carrying similar pinions, one for each column in which printing is to be duplicated. These pinions drive other ring gears that drive the type carriers. This method of driving type wheels is fully explained in United States Patent No. 1,693,279, issued November 27, 1927, to Walter J. Kreider, and therefore will be but briefly described herein.

In its present embodiment the instant machine is arranged to print various data and amounts in a plurality of columns on a statement sheet and on a detail strip in a single operation of the machine. This necessitates the identical setting of a series of type carriers, and the method disclosed in the patent referred to above is admirably adapted for use in driving a column printing mechanism of this type. Due to the fact that the printer driving mechanism is substantially duplicated in each denominational unit, it is thought that the explanation of one denominational unit and one transaction bank will be sufficient for the purpose of this specification.

Directing attention to Figs. 2, 10, and 11, a link 113 pivotally connects the segment 110 to an arm 114 secured on a shaft 115 journaled in the main frames 50. Also secured on the shaft 115 is a gear segment 116 which meshes with a ring gear 117 rotatably supported on a disk 118 fast on a hexagonal shaft 119 supported by printer end plates 120 and 121 and intermediate plates 122 and 123. The upper ends of the plates 120, 121, 122, and 123 are supported by a bar 124 secured to the main frames 50 and their lower ends are secured to extensions of the base plate 51. The gear 117 (Figs. 2 and 10) has secured thereto a gear 111 which meshes with a pinion 126 fast on a shaft 128 which also carries a pinion 127 meshing with a gear 112 fast to the side of another ring gear 125. Therefore movement of the gear 117 is transmitted to the gear 125 by means of the gears 111, 112, pinions 126 and 127, and the shaft 128. The gear 125 meshes with a first transaction type carrier 129 loosely mounted on a shaft 130 fixedly supported by the printer plates 120 to 123 inclusive.

From the foregoing description it will be seen that the differential movement of the first transaction bank latch, by means of the mechanism just described, is transmitted to the first transaction bank type carrier 129.

The type wheel operating mechanisms for the second and third transaction banks are similar to the mechanism of the first transaction bank. However, the second and third transaction banks employ an elimination mechanism similar to the zero elimination of the amount banks which is not used in the first transaction bank, and which will be described later in this specification.

*Control of second and third transaction type carriers during total taking operations*

The present machine has ten totalizers on the second or rear totalizer line and ten totalizers on the third or front totalizer line. As there are only nine keys in the second transaction bank and nine keys in the third transaction bank for selecting the different totalizers on these lines, it is necessary to employ the zero position in each of these banks to select the tenth totalizers for addition. Therefore, when no key is depressed in either the second or third transaction banks, the associated latches are broken at zero and thereby aline the tenth totalizers with the actuators. In the present arrangement the keys 57 in the second transaction bank, in addition to selecting their particular totalizer on the No. 2 line for addition, also select the tenth totalizer on the No. 3 line for addition to store a group total of the totalizers on the No. 2 line. Use of the keys 58 in the third transaction bank likewise, in addition to selecting the totalizers on the No. 3 line, also select the tenth totalizer on the No. 2 line for addition. This results in a group total of the gas amounts being stored in the tenth totalizer on the No. 3 line and a group total of the electric amounts being stored in the tenth totalizer on the No. 2 line (Fig. 1).

It will be remembered that in adding operations the add-selecting plates determine whether or not the wheels of the selected totalizers are engaged with the totalizer actuators, and for this reason, when no key is depressed in either the second or third transaction banks, the group totalizer on each of these lines will be alined with the actuators, but due to the arrangement of the add-selecting plates, neither totalizer will be selected for engagement with said actuators.

In adding operations when the No. 10 totalizers on the No. 2 and No. 3 lines are selected for operation, the differentials and type wheels will be stopped at zero position. During these operations, it is not desired to print a symbol, so the zero position of the type carrier is left blank. In total printing operations, however, it is desired to print symbols to indicate that the totals have been taken from these No. 10 totalizers, and mechanism is provided to shift the type wheels to move a symbol into printing position to indicate that a total has been taken from one of these totalizers.

To take a total from the No. 10 or group totalizer on the No. 2 line, the read or reset key 55 (Fig. 1) for the second bank is depressed and the machine released for operation by depressing the motor bar 53. As no key is depressed in the second transaction bank, the latch mechanism therefor is consequently broken by the zero stop lever, thus causing the group totalizer, located in zero position, to be engaged with the actuators and read or reset as the case may be. In this total taking operation, mechanism presently to be described, which is similar to the amount zero elimination mechanism, is employed to move the type carrier one step beyond zero to print a symbol characteristic of this particular operation.

Calling attention to Fig. 6, secured on the shaft 94 is an arm 176 connected by a link 177 to the total control plate 168, which is differentially positioned by means of the total control keys 55 (Fig. 1) to select the different totalizer lines for engagement with the actuators in read and reset operations as shown and described in the above mentioned Goldberg application Serial No. 559,720. Also fast on the shaft 94 is an arm 178 connected by a link 179 to a read and reset gear segment 180 turnably mounted on the shaft 115. The segment 180 meshes with a read and reset ring gear 181 rotatably supported by a disk 182 fast on the rod 119. The ring gear 181 (see also Figs. 10 and 11) drives a read and reset or X and Z type wheel 183 loosely mounted on the rod 130.

As the shaft 94 is operatively connected to the total control plate 168, the differential movement of said plate is obviously transmitted to said shaft. This, by means of the segment 180 and the ring gear 181, positions the type wheel 183 to print a symbol characteristic of the type of operation, read or reset, being performed.

Fast on the shaft 94 (Figs. 3 and 4) is a cam arm 184 having therein a cam slot 185 which cooperates with a stud 186 in a lever 187 pivoted on a bracket 188 mounted on the shafts 94 and 115. The lever 187 has an arcuate surface 189 which cooperates with a roller 190 carried by a slide 191 reciprocably mounted on the shaft 144 and the rod 142. The slide 191 (Fig. 3) has a notch 192 which cooperates with a stud 193 carried by an arm 194 pivoted on a second transaction bank gear segment 195 rotatably mounted on the shaft 115. The arm 194 has a cam slot which engages a stud 196 fast in a segment 197 pivoted on the shaft 94. The gear segment 195 meshes with a ring gear 198 (see also Figs. 10 and 11) which drives a second transaction type wheel 199 through the medium of a gear 510, pinion 511, shaft 512, pinion 513, gear 514, and ring gear 515 in exactly the same manner as explained for the first transaction bank earlier herein.

The segments 195 and 197 (Fig. 3) and the arm on 94 are differentially positioned by means of a transaction bank latch mechanism similar to that shown in Fig. 2 for the first transaction bank. This is accomplished by means of a link 209 which is driven by a beam in the second transaction bank, like the beam 107 of the first transaction bank.

Depressing either the read or the reset key 55 (Fig. 1) for the second bank, to take a total from the group totalizer on the No. 2 line, differentially positions the total control plate 168, and by means of the mechanism shown in Fig. 6, also differentially positions the shaft 94 (Figs. 3 and 4). This positions the arm 184 (Fig. 4) so that one of the symmetrical irregularities 201 of the cam slot 185, in cooperation with the stud 186, rocks the lever 187 a slight distance counter-clockwise (see also Fig. 3). This counter-clockwise movement of the lever 187 disengages the arcuate surface 189 from the roller 190, and as no key is depressed in the second transaction bank, the latch therefor is broken in the zero position. Consequently the segment 197 remains in the position here shown, in which position it does not block movement of the slide 191.

At the proper time a pawl 202 secured on the shaft 153 releases the slide 191 to the action of a spring 203 which moves the notch 192 into engagement with the stud 193 carried by the arm 194. Subsequent initial movement counter-clockwise of the shaft 144 rocks the rod 142 and the slide 191. The slide 191 in turn rocks the arm 194 clockwise, which, by means of the cam slot therein, in cooperation with the stud 196, moves the gear segment 195 a slight distance counter-clockwise. This, by means of the ring gear 198 and its driven train, moves the second transaction type wheel 199 (Figs. 10 and 11) one position beyond zero or home position, which, when an impression is made, causes an identifying symbol for the group totalizer on the No. 2 line to be printed.

The means for rocking the shaft 144 (Figs. 3 and 7) so that it in turn can operate the rod 142 and the slide 191 to set the special symbol type when the slide 191 is in effective position, as above described, is shown in Fig. 7.

Secured to the shaft 144 is a pair of arms 143 (only one being shown in this divisional case) which arms carry the rod 142. Also fast to the shaft 144 is an arm 146 to which is connected a pitman 147 carrying a roller 149 projecting into a race 150 of a box cam 148 secured to the cam shaft 52.

The race 150, through the means just described, rocks the shaft 144 first counter-clockwise, then clockwise to normal position to effect the functions of the rod 142 and slide 191.

The means for rocking the shaft 153 to cause the pawl 202 (Fig. 3) to release the slide 191 to render the latter effective and to restore the slide to its ineffective position is shown in Fig. 8.

Secured to the shaft 153 is an arm 154 bifurcated to engage a stud 155 in a cam lever 156 pivoted on a stud 157 carried by a bracket on the base (not shown). The lever has rollers 158 and 159 cooperating with companion cams 160 and 161 secured to the cam shaft 52.

At the proper time the cams 160 and 161 rock the shaft 153 (Figs. 3 and 8) and pawl 202 counter-clockwise whereby the latter releases the slide 191 to the action of its spring 203 as above described. Later, after the slide 191 has been rocked counter-clockwise to perform its above described function and has been returned clockwise to normal position, the cams 160 and 161 rock the shaft 153 and pawl 202 clockwise, whereby the pawl 202 restores the slide 191 to its normal ineffective position (Fig. 3).

Again calling attention to Fig. 3, after the impression is completed, the shaft 144, rod 142, and slide 191 are returned clockwise to normal position, which, it will be noted, returns the arm 194 counter-clockwise also to normal position, in which position it is retained by a spring 204.

The third transaction bank has mechanism similar to that just described for the second transaction bank for moving the third transaction bank type wheel 520 (Figs. 10 and 11) one position beyond zero or home position to print an identifying symbol when the group totalizer on the No. 3 line is being read or reset. This type wheel 520 is driven by a ring gear 521 carrying a gear 522 meshing with a pinion 523 on a shaft 524, which also carries a pinion 525 meshing with a gear 526 secured to a ring gear 527. This gear 527 is driven by a segment 528 see also Fig. 5) which is controlled by means of a cam arm 205 (Fig. 5) secured on the shaft 94 and having therein a cam slot 206 with symmetrical irregularities 207 which cooperate with a stud 208 carried by a lever 209 secured on a bracket 210 mounted on the shafts 94 and 115.

Depressing the read or reset key 55 (Fig. 1) for the third transaction bank positions the arm 205 so that one of the irregularities 207 is opposite the stud 208. This rocks the lever 209 in exactly the same manner as explained for the second transaction bank, which, by means of mechanism similar to that shown in Fig. 3, moves the segment 528 to operate the train of gears above described to move the type wheel 520 for the third transaction bank one position beyond zero or home position to print a symbol "E" or "G", as shown in Fig. 9, for the group totalizer on the No. 3 line, as explained above.

*Impression mechanism*

It is not deemed necessary for this divisional application to go into any detailed description of the impression mechanism. The hammers 261 for making the impressions from the type wheels on the detail strip (Fig. 9) are illustrated in Fig. 10.

*Method of operation*

In explaining the method of operation of the machine—for instance, when used in a public utility company supplying electric current and gas to a plurality of customers—each customer has a meter to measure the consumption of electric current in kilowatt hours and a gas meter to measure the consumption of gas in cubic feet.

The meter reader copies the present electric and gas meter readings on each customer's chart or sheet and manually subtracts the previous readings from the present readings and enters these differences, which in the first instance are kilowatt hours of electricity consumed and in the second the cubic feet of gas consumed, in the proper space upon the sheet. At the end of the day the book for the route covered is turned over to the audit department, where a rate is figured from the charts and the cost of the electricity and gas consumed is entered upon each subscriber's sheet.

From the audit department the meter books go to the billing department, where individual bills or statement slips are made out from the data contained in the meter book.

With the totalizers of the machine all clear, the operator begins making out the statement slips for a particular meter book. After all of the bills or slips are made out for that book, the totalizers are cleared and the portion of the audit strip (Fig. 9) covering the computations for that particular book is removed from the machine, so that the audit strip may be checked against the meter book.

In printing totals on the audit strip, it is highly desirable to have some symbol indicating what the various totals are, such as the electric and gas, and therefore the present machine is provided with mechanism to print symbols designating such totals.

It is this particular part of the machine which involves the present invention of this divisional application.

After all the statements have been made out for a particular meter book, the "KWH" totalizer on the No. 1 line is released to print the grand total kilowatt hours consumption (1826) upon the audit strip. This is accomplished by depressing the "KWH" key 56 in conjunction with the first bank "reset" key 55 and releasing the machine for operation, by means of the "motor bar" 53.

Next, the grand total ($114.50 E) of electric amounts is printed upon the audit strip by clearing the ("Total $ elec") totalizer on the No. 2 line. This is accomplished by depressing the second bank "reset" key 55 and releasing the machine for operation. The "E" printed after the total $114.50 is a symbol designating that this amount is for electric current.

After this, the grand total (1600) of the hundred cubic feet of gas consumed is printed upon the audit strip by clearing the "100s cu. ft." totalizer on the No. 1 line. This is accomplished by depressing the "100s cu. ft." key 56 in conjunction with the first bank "reset key 55" and operating the machine.

Finally the "Total $ gas" totalizer on the No. 3 line is cleared to print the grand total ($155.10 G) of gas amounts upon the audit strip. This is accomplished by depressing the third bank "reset" key 53 and releasing the machine for operation in the usual way. The "G" symbol which is printed after the amount $155.10 designates that this amount is for the consumption of gas.

While the form of mechanism here shown and described is admirably adapted to fulfill the objects primarily stated, it is to be understood that it is not intended to confine the invention to the form or embodiment herein disclosed, for it is susceptible of embodiment in various forms all coming within the scope of the claims which follow.

What is claimed is:

1. In an accounting machine, the combination of type carriers; differential means to adjust the type carriers; means to transmit the movement of the differential means to the type carriers; means operable when the transmitting means and the type carriers are in a predetermined position, to give the type carriers and a part of the transmitting means a movement independently of the movement given by the differential means; a total control member; and means governed by the total control member to control the moving means which gives the type carriers their independent movement.

2. In an accounting machine, the combination of type carriers; an element; differential means to position the element; means connecting the element to the type carriers; means operable when the element is in a predetermined position to move the connecting means and the type carriers independently of the movement given by the element and the differential means; a total control member; and means operated by the total control member when in certain positions to render the moving means effective.

3. In a machine of the class described, the combination of type carriers; an element; differential means to position the element; means to transmit the differential movement of the element to the type carriers; means to give the transmitting means and the type carrier a movement independently of the movement given by the differential means, when the element is in a certain position; a total control member; and means operated by the total control member to control the means which gives the transmitting means and type carriers their independent movement.

4. In a machine of the class described, the combination of type carriers; an element; differential means to position the element; means including a gear segment and an arm to transmit the differential movement of the element to the type carriers; means cooperating with the arm when the element is in a certain position to readjust the gear segment and the type carriers; a total control member; and means operated by the total control member to control the moving means irrespective of the position of the element.

5. In a machine of the class described, the combination of a type carrier; a differentially positioned element; means to transmit the differential movement of the element to the type carrier; means effective when the element is in a certain position to move the transmitting means independently of the differential movement of the element to move the type carriers to a particular printing position; a total control plate; a member positioned by the total control plate; and a part actuated by the member to control the moving means so that the moving means may coact with the element when the element is in said certain position.

6. In a machine of the class described, a symbol type carrier; a bank of transaction keys; a total control means; means differentially controlled by said keys for positioning the type carrier in certain operations; and means controlled by said total control means and jointly operable with said differentially controlled means to position the carrier in a predetermined position in other operations.

CHARLES H. ARNOLD.